United States Patent [19]

Nishikawa

[11] Patent Number: 4,805,033
[45] Date of Patent: Feb. 14, 1989

[54] METHOD OF FORMING OBLIQUE DOT PATTERN

[75] Inventor: Masaji Nishikawa, Hachioji, Japan

[73] Assignee: Olympus Optical Co., Ltd., Tokyo, Japan

[21] Appl. No.: 177,266

[22] Filed: Apr. 4, 1988

[30] Foreign Application Priority Data

Feb. 18, 1987 [JP] Japan .................................. 62-33374

[51] Int. Cl.⁴ .......................... H04N 1/21; H04N 1/40
[52] U.S. Cl. ...................................... 358/298; 358/283
[58] Field of Search ............... 358/298, 300, 302, 283, 358/284, 285, 293, 294, 296; 346/108, 107 R, 160

[56] References Cited

U.S. PATENT DOCUMENTS 4,185,304  1/1980  Holladay .............................. 358/298
4,553,173  11/1985  Kawamura .......................... 358/283

Primary Examiner—E. A. Goldberg
Assistant Examiner—Mark Reinhart
Attorney, Agent, or Firm—Armstrong, Nikaido Marmelstein & Kubovcik

[57] ABSTRACT

A method of forming an oblique dot pattern in an element-density tone production method which uses two types of recording dots comprising a dark value and a light value and a specific matrix structure, whereby pseudo-gradation recording is performed by assigning recording dot positions in a matrix by means of a matrix pattern in accordance with gradation steps of a recording signal, the oblique dot pattern forming method being characterized in that: a plurality of sets of matrix patterns are provided for the purpose of ensuring that a plurality of different matrix patterns can be selected and assigned to each gradation step; the plurality of sets of matrix patterns being selected and arranged cyclically in matrix pattern areas which are longitudinally and laterally arranged over a recorded image; and the matrix patterns being so constituted that recorded aggregated dots are arranged in a predetermined oblique angle with respect to the longitudinal and lateral directions of the recorded image.

As a result, an oblique arrangement of the aggregation of the recording dots can be easily obtained without involving any complicated conversion calculations or edition process which causes increase in the capacity of the pattern memory.

6 Claims, 8 Drawing Sheets

FIG.IA
PRIOR ART
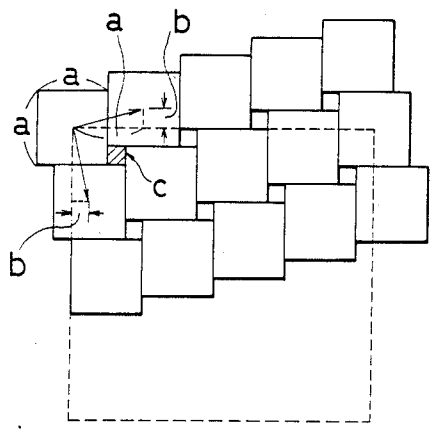
FIG.IB
PRIOR ART
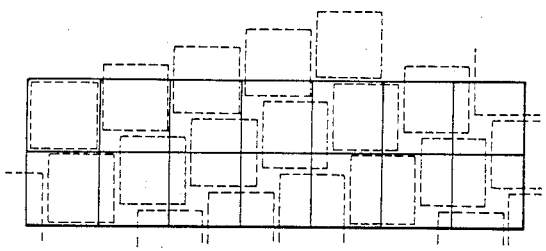

FIG.9A
| 3 | 4 | 12 | 16 |
|---|---|----|----|
| 11| 9 | 6  | 14 |
| 5 | 1 | 2  | 7  |
| 8 | 3 | 4  | 12 |
5
| 15| 11| 9 | 6 |
|---|---|---|---|
| 10| 5 | 1 | 2 |
| 13| 8 | 3 | 4 |
| 16| 15| 11| 9 |
6
| 14| 10| 5 | 1 |
|---|---|---|---|
| 7 | 13| 8 | 3 |
| 12| 16| 15| 11|
| 6 | 14| 10| 5 |
7
| 2 | 7 | 13| 8 |
|---|---|---|---|
| 4 | 12| 16| 15|
| 9 | 6 | 14| 10|
| 1 | 2 | 7 | 13|
8
FIG.9B
(m) 
(n) 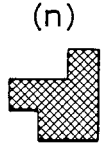
(o) 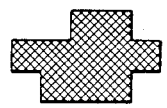
(p) 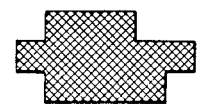
(o') 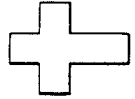
(p') 

METHOD OF FORMING OBLIQUE DOT PATTERN

BACKGROUND OF THE INVENTION

1. Field of the Invention

This invention relates to a method of forming oblique dot pattern in a tone production method by density of each element (described "element-density tone production method" hereinafter).

2. Prior Art

In order to record a gradation image utilizing a method employing two values comprising a dark value and a light value such as black and white, it is conventional practice to employ a method in which a half-tone is recorded by increasing or decreasing the number of recording dots which are recorded in each area of a predetermined matrix structure, this system being called an element-density tone production method. Various element-density tone production methods are: a density-pattern method which is constituted in such a manner that a plurality of dot areas are assigned to a picture element, a dither method in which one dot is assigned to a picture element, and the recording of each dot is determined by a threshold matrix with different thresholds, and a mixture of the above two methods. With an element-density tone production method, it is known that a better-quality image can be obtained if the recording dots are arranged in an aggregate manner having a certain regularity, rather than in such a way that they are arranged randomly. Various types having large aggregation units are known, such as a half-tone dot type and a vortex type. Known types in which aggregation units are dispersed are a dispersed type and the Bayer type. A type is selected in accordance with the characteristics of the image to be recorded.

When a color image is formed by the above-described element-density tone production method in which images of respective colors are superimposed, two major defects occur if the registration of the superimposed dots slips. One of them is the generation of moire fringes. If repetative patterns having the same or similar period are superimposed, fringe patterns with a long period, which are not present in the original image, are generated by any slight positional offset of the repetative patterns. Another defect occurs when dots of different colors are superimposed. The color produced when the dots are completely superimposed differs from the produced when the dots are offset, therefore color reproduction becomes unstable.

In printing, in order to overcome the above-described problems, the angle of each array of half-tone dots is changed in accordance with print color so that the period of moire fringes is restricted to a small value in order to make the moire fringes unnoticeable. Furthermore, the degree of superimpose of each colors dots is arranged to successively change in accordance with the location of each dot, keeping the degree of superpositioning constant as a whole.

Thanks to employment of the above-described means, if the position at which each color image is formed slips, the state of the printed image does not significantly change. Such means is a key technology for commercial color printing.

However, in a device which records an image based on information which has been converted into an electrical signal, the recording image dots are usually recorded at specific positions arranged in the vertical and horizontal directions of the recording paper because of restrictions imposed by the recording mechanism or recording head. Therefore, since they cannot be arranged in an oblique manner, as can be conducted in printing, the above-described problems cannot be overcome.

In the above-described element-density tone production method, since the dot recording is performed in such a manner that recording dots are aggregated in a matrix area having a predetermined number of dot recording positions, an attempt can be made to obtain the same effect as that obtained in printing by arranging half-tone dots in an oblique manner, by arranging central positions of the aggregated dots in an oblique manner.

For example, pages 15 to 20 in the proceedings of the Second Non-Impact Printing Technology Symposium sponsored by the Electrophotographic Society gives a method of obtaining an oblique arrangement of aggregated dots, FIG. 1A illustrating the method. In this figure, $a \times a$ squares surrounded by solid lines indicate matrix areas for element-density tone production, each constituted by an $a \times a$ dot areas. The positions of the dots in the matrix areas are assigned to gradation steps, the dots being dots to be recorded. The system is so constituted that one matrix pattern is assigned to one gradation step. In order to arrange the recording dots on an oblique line, the neighbouring matrix areas are arranged in such a manner that they are offset by b in both the longitudinal and lateral directions, creating c which are not assigned to any matrix areas. Therefore, when these areas c are dot-recorded, the formation of the recording dots is arithmetically interpolated in accordance with the state of the gradients of the neighbouring matrix areas. The angle of the aggregated dots can be changed by changing the value of b. Therefore, by changing the value of b in accordance with the colors to be superimposed, various oblique angles can be obtained.

FIG. 1B illustrates the state of superposition of the matrix areas when $b=0$, and that when $b=a/4$. The solid lines show the former case while the dashed lines show the latter case. This arrangement ensures that the matrix areas are so constituted that 16 ways of superpositioning repeat periodically. Therefore, even if the recorded position of the colors are offset, substantially no change in averaged superposition ratio occurs, and the period of moire fringes is significantly shortened making the moire fringes inconspicuous.

Although the conventional method shown in FIGS. 1A and 1B in which the aggregated dots are arranged in an oblique manner, is significantly effective in stabilizing the recorded image, the signal processing circuit for realizing the oblique arrangement of the aggretaged recorded dots is too complicated. That is, the factors which are needed to realize signal processing are as follows:

(1) Original recording image information is information that is arranged in the longitudinal and lateral directions of the recording sheet, as shown by the solid lines of FIG. 1B. If the original recording image information is converted by the density pattern method into the oblique arrangement shown by the dashed lines, the gradation step of each dashed-line matrix area must be assigned by calculation from the gradation steps of the solid-line matrix areas in the areas in which the dashed lines and the solid lines do not coincide. If the dither method is used, a dither pattern which has been previously arranged in an oblique manner and has a large size may be prepared, but, in this case, the matrix size of the dither pattern becomes extremely large.

(2) With the density pattern method, after the density of the obliquely-arranged matrix area has been determined, the matrix pattern of each assigned gradation step is read from a look-up table. After this matrix pattern has been edited on a screen to arrange the matrix pattern in an oblique manner, recording lines are read out along the lateral direction of the screen to suit the recording system, for the purpose of generating a raster signal.

(3) The recording dots for the empty areas c which are not assigned to any matrix areas must be arithmetically interpolated, therefore, these areas can easily cause errors in recording.

As described above, when the oblique arrangement method shown in FIGS. 1A and 1B is applied to the density pattern method, large-scale calculations must be performed at high speed. On the other hand, with the dither method, the complication of the calculations can be slightly reduced, but the size of the dither matrices becomes too large. In both of the above two methods, error regions c are inevitably formed in accordance with the conversion.

SUMMARY OF THE INVENTION

An object of the present invention is to overcome the above-described problems experienced in the conventional aggragate dot oblique arrangement method. This invention can be applied to both the density pattern method and the dither method, or to a processing method in which those two methods are mixed. An object of the present invention is to provide a method of forming an oblique dot pattern without a complicated arithmetic process or the generation of conversion errors.

In order to overcome the above-described problems, a method of forming an oblique dot pattern in an element-density tone production method which uses two types of recording dots comprising a dark value and a light value and a specific matrix structure, whereby pseudo-gradation recording is performed by assigning recording dot positions in a matrix by means of a matrix pattern in accordance with gradation steps of a recording signal, the oblique dot pattern forming method being characterized in that: a plurality of sets of matrix patterns are provided for the purpose of ensuring that a plurality of different matrix patterns can be selected and assigned to each gradation step; the plurality of sets of matrix patterns being selected and arranged cyclically in matrix pattern areas which are longitudinaly and laterally arranged over a recorded image; and the matrix patterns being so constituted that recorded aggregated dots are arranged in a predetermined oblique angle with respect to the longitudinal and lateral directions of the recorded image.

By forming the oblique dot pattern as described above, a matrix pattern itself can be directly and selectively specified from the gradation steps of the original recorded image, without necessitating the processing of conversion calculations. Furthermore, the cyclically-selected matrix patterns are successively arranged in pattern areas along the longitudinal and lateral directions of the recorded image surface. Therefore, recording dot line signals can be obtained without a complicated editing process. Furthermore, the matrix patterns can be fitted into the pattern areas without forming any empty areas or superimposed areas, preventing the generation of errors caused by conversion. Furthermore, a method of forming an oblique dot pattern which can be applied to any of the density pattern method, the dither method or a method combining the two can be provided.

BRIEF DESCRIPTION OF THE DRAWINGS

FIGS. 1A and 1B illustrate the conventional method of obtaining the oblique arrangement of the aggretated dots;

FIGS. 2A to 2C illustrate an embodiment of the present invention, wherein

FIG. 2A illustrates an image surface formed by repetitions of a 4×4 matrix pattern;

FIG. 2B illustrates a matrix pattern formed by cutting a matrix area unit from the image surface shown in FIG. 2A;

FIG. 2C illustrates a plane in which 4×4 matrix areas are arranged in both the longitudinal and lateral directions, and a state in which the matrix pattern shown in FIG. 2B is disposed in this plane;

FIGS. 5A to 5C illustrate another embodiment of the present invention, wherein

FIG. 5A illustrates an image surface formed by repetitions of a 4×4 dither matrix pattern;

FIG. 5B illustrates dither matrix patterns cut from the image surface shown in FIG. 5A;

FIG. 5C illustrates a state in which dither matrix patterns are selected and periodically arranged;

FIGS. 7A and 7B illustrate another embodiment of the present invention, wherein

FIG. 7A illustrates matrix patterns corresponding to the same gradation step;

FIG. 7B illustrates a state in which the matrix pattern shown in FIG. 7A are selected and arranged cyclically;

FIGS. 8A and 8B illustrate a still further embodiment of the present invention, wherein FIG. 8A illustrates 4 matrix patterns having the different number of recording dots;

FIG. 8B illustrates a state in which the matrix patterns shown in FIG. 8A are selected and arranged cyclically;

FIGS. 9A and 9B illustrate a case in which the embodiment shown in FIGS. 8A and 8B is applied to the dither method, wherein FIG. 9A illustrates a dither matrix pattern which is selected and arranged cyclically; and FIG. 9B illustrates shapes of aggregated recording dots and non-recording dot regions.

DETAIL DESCRIPTION OF THE PREFERRED EMBODIMENTS

Figure 2A:
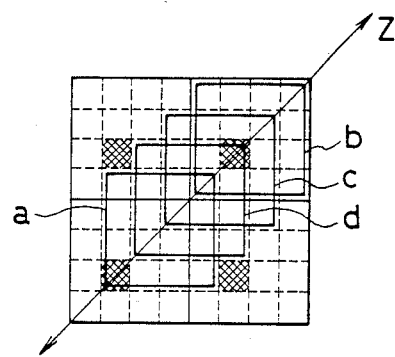
Figure 2B:
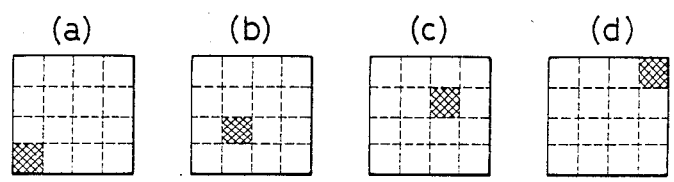
Figure 2C:
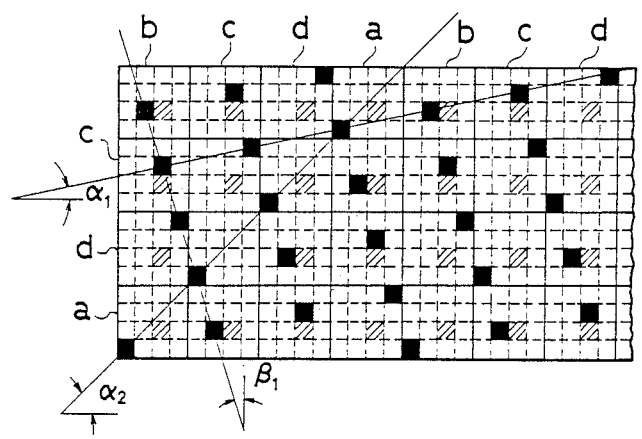

The preferred embodiments will now be described. FIGS. 2A to 2C illustrate a method of forming an oblique dot pattern according to an embodiment of the present invention. In this embodiment, a case is described in which this invention is applied to a density pattern method using the marix size of 4×4. If the gradation step is 1/16, that is, only one dot recording dot presents in a 4×4 matrix area and all the other records in the other dot areas are white, the recording dots are disposed at a period of 4 dots in the area of the image surface of the same gadation step. An optional 4×4 dot matrix area cut from this dot area necessarily includes one recording dot which corresponds to the gradation step 1/16.

By cutting the dot space along an oblique line Z at 45 which connects the recording dots in a matrix area unit as shown by four square frames of a, b, c and d, four different matrix patterns (a), (b), (c), and (d) are obtained as shown in FIG. 2 (B). Each of these matrix patterns (a), (b), (c), and (d) corresponds to the gradation step 1/16.

Next, FIG. 2 (C) illustrates a plane in which the matrix areas 4×4 are disposed on the recording image surface in the longitudinal and lateral directions and a state in which a plurality of matrix patterns (a), (b), (c), and (d) which belong to the above-described same gradation steps are selected and arranged cyclically. That is, in this illustration, the matrix patterns are laterally disposed in an sequential order of a, b, c, d, a, b, c, ... from the left of the image surface toward the right of the same, and the matrix patterns are disposed from the top of the image surface toward the bottom of the same in the sequential order of a, b, c, d, a, b, c, .... As a result of this, the recording dots are disposed in the lateral direction at an angle of $\alpha_1 \approx 12°$, $\alpha_2 = 45°$ in a manner of upward to the right. In the lontitudinal direction, the recording dots are disposed at an angle of $\beta_1 \approx 18.5°$ in a manner of downward to the right or at an angle of 45° in a manner of downward to the left. Furthermore, the period of repetition of the recording dots in the lateral direction is 5 dots, while in the longitudinal direction, it is 3 dots.

FIG. 2C shows the positions of the recording dots of the gradation steps 1/16 in a conventional method in which one matrix pattern is assigned to each gradation step using a matrix area of 4×4, the positions being shown by hatched sections.

As can be clearly seen from FIG. 2C, when both are superimposed, the dot positions of them cyclically closes or separates from each other, therefore, the average distance between recording dots of them are not significantly changed if the superimposed positions of the two recording images are offset. The change of the recording colors which can be visually recognized is significantly small in a case where the color of the two recording dots are different. Furthermore, the period of the moire fringe is a period of four matrix area unit, therefore, this period is short enough which can be made the moire fringe unnoticeable.

In FIG. 2C, the hatched dot arrangement shown for the purpose of comparison is called a reference dot arrangement. The cyclical change in distance between this reference dot arrangement and the oblique dot arrangement according to this embodiment is analyzed, resulting that since the oblique arranged dots shown in FIG. 2C causes the change of the pitch of the dots arranged in the longitudinal and the lateral directions, the average distance between dots can be stabilized.

In a color image recording, an image is formed by at least three primary colors for subtractive color process: cyanogen, magenta, and yellow and in some cases adding black, therefore three or four colors are superimposed. The angle of the arrangement of the dots for each color must be changed.

Figure 3:
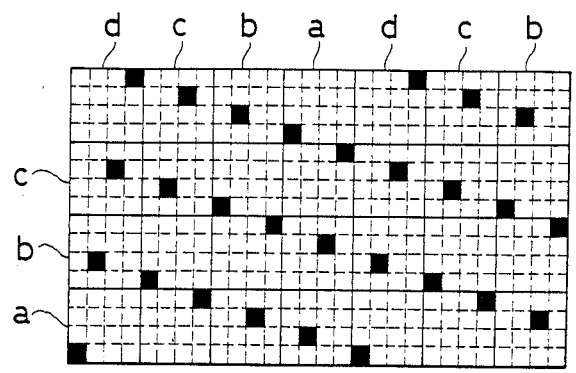
FIG. 3 illustrates a state in which the sequential order of the arrangement of the matrix patterns is changed.

By changing the sequential order of the combination of the matrix patterns shown in FIG. 2B, various oblique angles can be obtained. For example, FIG. 3 shows the state of the arrangement of the recording dots when the matrix pattern is arranged in the sequential order of (d), (c), (b), and (a) in the longitudinal and lateral directions. The direction is reversed to that in the arrangement of the recording dots shown in FIG. 2C. Furthermore, the oblique angle in the longitudinal and lateral directions are exchanged each other.

Figure 4:
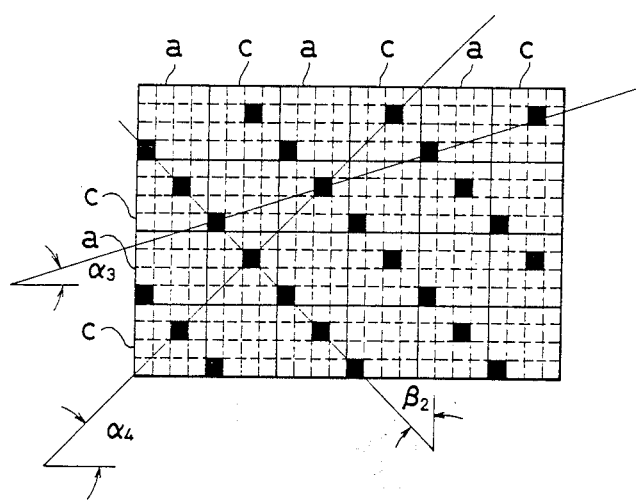
FIG. 4 illustrates a state in which the selection of the matrix patterns is changed.

By changing the selection of the matrix patterns, various oblique angles can be obtained. For example, FIG. 4 illustrates a state in which only the matrix patterns (a) and (c) shown in FIG. 2B are used and are alternately disposed in the longitudinal and lateral directions. In this case, the angles $\alpha_3$ and $\alpha_4$ of the arrangement of the devices in the lateral directions are substantially 18.5° and 45°, respectively. The angle $\beta_2$ of the arrangement in the longitudinal direction is 45°. However, since the period of the repetition of the matrix pattern is two matrix areas, the effect of stabilizing the positional offset of the recording is decreased. However, it can be used as one of the recording images by three to four colors when color image recording is conducted.

As described above, by using four matrix patterns provided in accordance with the same gradation step shown in FIG. 2B, the probability of arrangement of recording dots having various oblique directions and angles is illustrated. The way to cut the matrix pattern which corresponds to the same gradation step is not limited to this description. For example, by determining the cutting pattern with the positions shifted in the direction perpendicular to the oblique line Z shown in FIG. 2A, the dot arrangement in another direction and different angle can be obtained. By assigning these patterns to each recording images of each color, the required oblique angle of the recording dots can be obtained.

In FIGS. 2A to 2C and FIGS. 3 and 4, an example in which a specific gradation step is illustrated, the specific gradation step being formed by applying the present invention to the density pattern method. Therefore, in this case, actually, a plurality of matrix patterns are prepared for each of the gradation step so as to be cyclically selected. Even if the gradations steps of the matrix patterns are various, the recording dots can be positioned without any defects when recording the changing gradation density by way of relatively relating the selecting sequence so as to locate the central position of the aggregation of dots on a sequential oblique arrangement line.

Figures 5A, 5B:
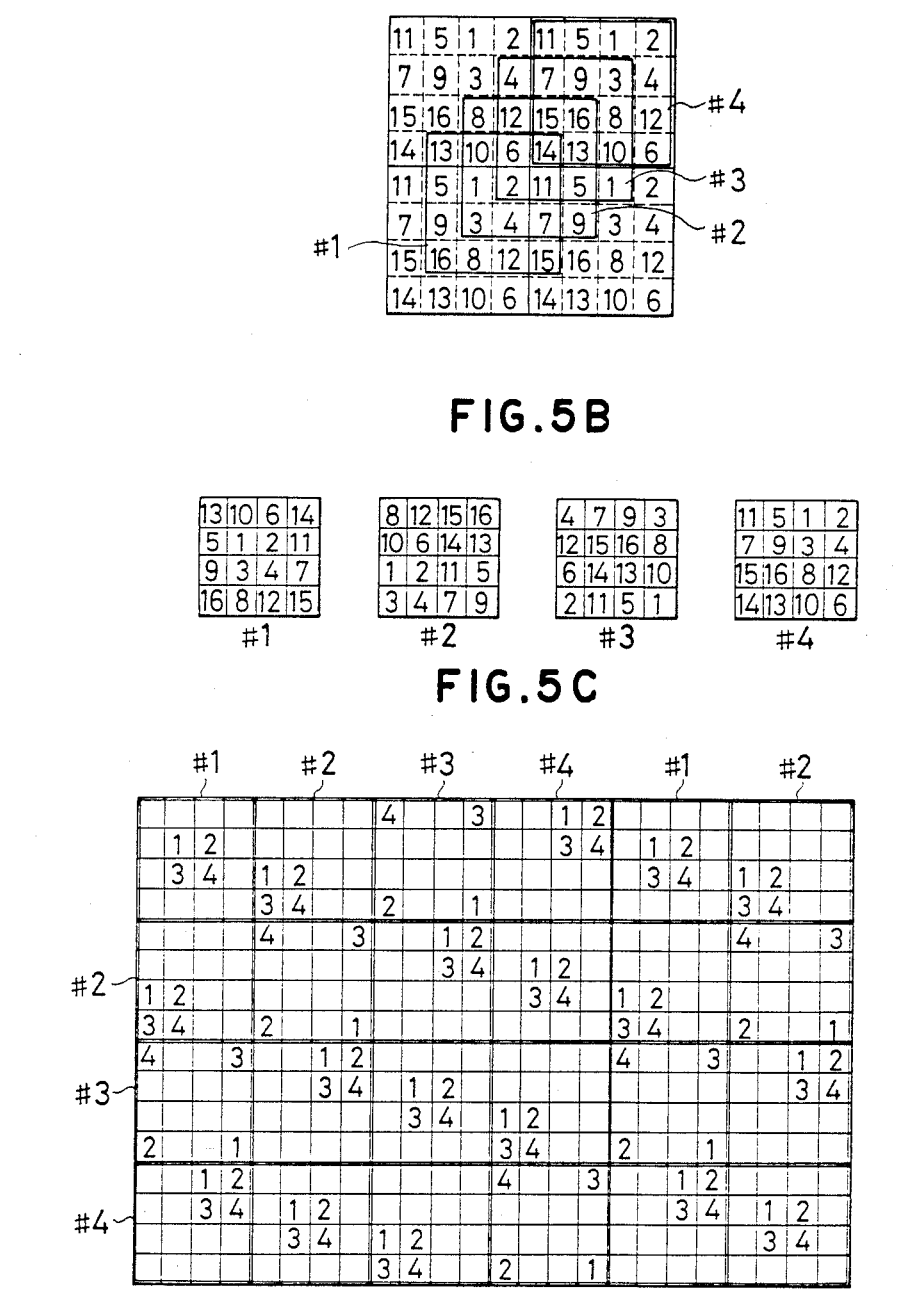

When present invention is applied to a dither method, the present invention can be executed more easily. FIGS. 5A to 5C illustrate the method of executing the present invention. In FIG. 5A, FIG. #1 illustrates an example of a dither pattern with a 4×4 matrix area. The dither pattern is formed by threshold matrix of a halftone dot type expanding from the central position. Each numerals shows a threshold. The image surface is constituted by repetition of these matrix patterns. FIG. 5A shows the partial image obtained by way of cutting. The matrix pattern formed by a 4×4 matrix area is cut from the image surface formed by these matrix patterns. In this case, the cutting position are made offset along the 45 -oblique line as shown in FIGS. #1 to #4 . As a result, four dither matrix patterns #1 to #4 can be obtained as shown in FIG. 5B.

Next, as shown in FIG. 5C, the four dither matrix patterns #1 to #4 are cyclically selected for assigning to each matrix area which is arranged in the longitudinal and the lateral directions of the image surface. In FIG. 5C, in the resulted threshold matrices #1 to #4, only threshold dots 1 to 4 which have high appearance ratio are shown, the dots each being provided with a number. The aggregation of the dots are disposed in an oblique manner so as to meet the object of the present invention.

With the dither method, since the threshold matices and the image information are superimposed, the recording dots corresponding to each gradation step are determined in its density with comparison to the thresholds of the matrices. Therefore, it is not needed to prepare the other matrix patterns for gradation steps as needed in the density pattern method. A common dither matrix patterns can be applied to all gradations.

Figure 6A:
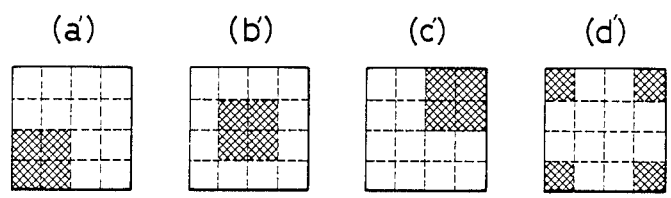
FIG. 6A illustrates 4×4 matrix patterns in which 4 dots are recorded.
Figure 6B:
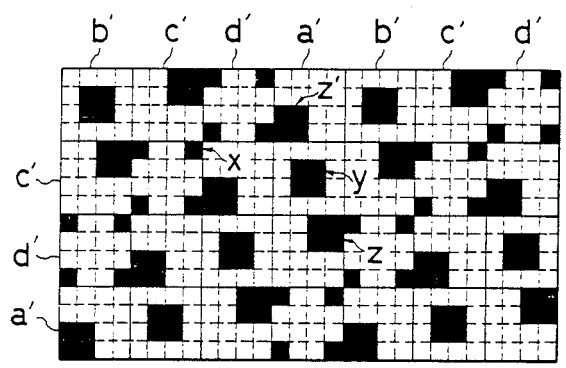
FIG. 6B illustrates a state in which the matrix patterns shown in FIG. 6A are selected and arranged cyclically.

As described above, the basic method of cutting the plurality of matrix patterns according to the present invention and effects caused by the former obtained in the density pattern method and the dither method are described. FIG. 6A shows four types of matrix patterns (a'), (b'), (c'), and (d') when four dots of the 4×4 matrices are recorded. FIG. 6B illustrates the distribution of the recording dots when these four types of the matrix patterns (a'), (b'), (c'), and (d') are cyclically disposed in a recording image surface. As shown in FIG. 6B, although the matrix areas are arranged in the longitudinal and the lateral directions on the recording image, the aggregation of the recording dots are disposed on an oblique line. Although this arrangement can meet the present invention, the number of dots aggregated differs in each aggregation by a detailed observation. That is, in FIG. 6B, the aggregation of dots shown by x is an aggregation of two recording dots, while the aggregation of dots shown by y is an aggregation of four recording dots. The aggregation of dots shown by z or z' are aggregations of five recording dots. The dispersion of the number of the recording dots in an aggregated dots causes to be recognized as the slight increase in grain touch of the record or an abnormal structure.

An embodiment for reducing the above-described grain touch will now be described. In this embodiment, the matrix pattern is determined in such a manner that each of the plurality of matrix patterns which are selected and arranged cyclically in the matrix areas in the longitudinal and the lateral directions of the image surface has the same number of recording dots when the same gradation step recording is performed. Furthermore, each matrix pattern includes an arrangement which is different from the pattern which is cut by slipping the cutting position from a plane in which the set of the matrix pattern is repeatedly arranged. As a result of this, the number of recording dots at each aggregated position for recording dots is made uniform when the plurality of matrix patterns are selected and arranged cyclically on an image surface.

Figure 7A:
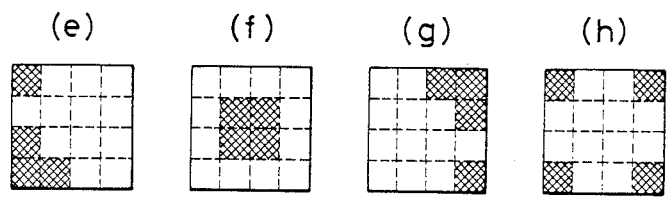
Figure 7B:
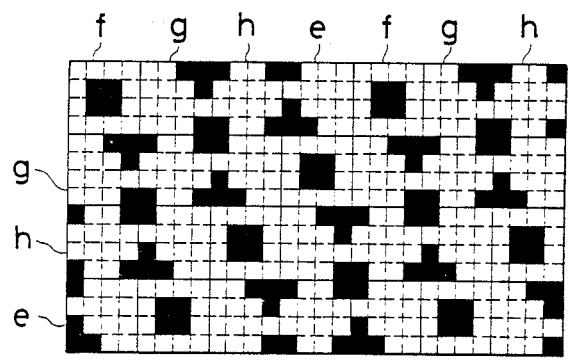

FIGS. 7A and 7B illustrate the above-described embodiement. FIG. 7A illustrates matrix patterns (e), (f), (g), and (h) which correspond to the same gradation step which is applied to the density pattern method, the size of the matrix being 4×4. The number of recording dots included in each pattern (e) to (h) is four, and the gradation expressing characteristics for each matrix pattern is arranged to the same each other.

The above-described patterns (a'), (b'), (c') and (d') shown in FIG. 6A are the patterns obtained by cutting a plane in which a set of patterns formed by four recording dots aggregated in a 4×4 matrix is repeated shifting the cutting position by one dot along the 45° oblique line. In each pattern (e) to (h) shown in FIG. 7A, the arrangements of the recording points of the matrix pattern (e) which corresponds to (a') and (g) which corresponds to (c') are modified as illustrated. By selecting and cyclically arranging these matrix patterns (e) to (h) on the recording surface, the number of the recording dots at the aggragating position are four without exception as shown in FIG. 7B. In comparison to the recording image shown in FIG. 6B, the improvement in the uniformity of the recording image is illustrated.

In the density pattern method, since the positions of the recording dots can be optionally and previously assigned to each gradation step, the positions of the dots can be modified without involving any change of the number of the recording dots in the matrix pattern, for the purpose of uniforming the number of recording dots at the position at which the recording dots are aggregated on the recording image surface.

The similar treatment can be conducted in the dither method. For example, the dither patterns #1 to #4 shown in FIG. 5B are each corresponded to the density pattern (e) to (h) shown in FIG. 7A in such a manner that #1 corresponds to (f), #2 corresponds to (e), #3 corresponds to (h) and #4 corresponds to (g). Therefore, 2 and 8 are replaced in the dither pattern #2, and 3 and 6 are replaced in the dither pattern #4 for the purpose of making the sequence of arrangement as #2, #1, #4, and #3.

When the positions of the recording dots are assigned or the thresholds of the dither patterns are determined, the processing can be easily conducted in the following manner as shown in FIGS. 2C, 3, 4, 5C, 6B, and 7B: the matrix areas are provided in the longitudinal and the lateral directions on the recording image surface. Furthermore, the positions for aggregating the recording dots which are arranged in an oblique manner are determined, and the pattern is determined satisfying the conditions for making the number of recording dots constant in each matrix area with respect to each aggregated point and increasing the number of recording dots or the levels of thresholds.

Meanwhile, the quality of image can be improved by uniforming the number of recording dots at each aggregating point for recording dots. However, a further improvement can be obtained because the shape of aggregation of the recording dots is not uniform. An embodiment will now be described in which a further improvement in quality of image is intended by uniforming the number of the aggregated dots and the shape of the same. In this embodiment, in a plurality of matrix patterns which are arranged selectively and cyclically in the matrix areas in the longitudinal and the lateral directions of the image surface, the matrix pattern is determined in such a manner that the total sum of the number of the dots which are recorded in one period of the combination of each pattern is made equal to the total sum of the number of recording dots which are necessary for expressing the specified gradation step in the subject area, however, the number of the recording dots in each matrix pattern becomes non-uniform. As a result of this, the number of the aggregated recording dots and the shape of the same at the position at which the recording dots are arrgegated are made uniform.

Figure 8A:
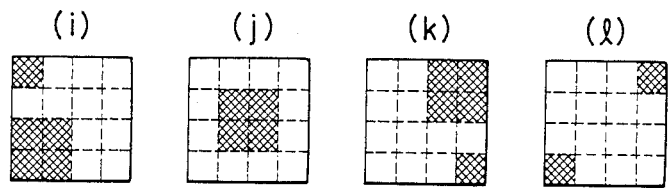
Figure 8B:
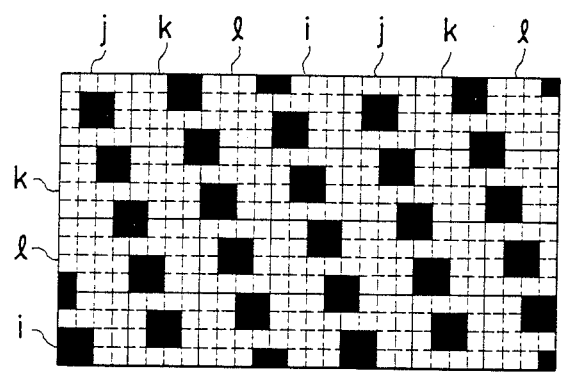

FIGS. 8A and 8B illustrate the above-described embodiment, in which this embodiment is applied to a density pattern having four recording dots in a 4×4 matrix. FIG. 8A illustrates four matrix patterns (i), (j), (k), and (l). The number of the recording dots in each pattern is arranged in such a manner that they have different number of recording dots such as that (l) has two, (j) has four, (i) and (k) each has five, respectively. The total sum of the recording dots included in one period of the repetition of the matrix patterns (i) to (l) is 16 which is arranged to coincide with the total sum 16 of the recording dots to be recorded when four 4×4 areas are aggregated in a case where this gradation step is expressed. A cyclical and selective arrangement of the above-described matrix patterns (i) to (l) in the matrix areas which arranged in the longitudinal and the lateral directions of the recording image causes the pattern arrangement shown in FIG. 8B to be obtained. The number of the recording dots and the shape of the aggregation at the position at which the recording dots are aggregated are made uniform. Therefore, the deterioration in the quality of the image caused by the non-uniformity of the number of the aggregated dots or that of the shape can be completely prevented.

The procedure shown in the above-described embodiment can be similarly applied to the dither method. The operation for determining the positions of the recording dots and the threshold matrices which are made correspond to the increase in the number of recording dots due to the change of the gradation steps can be conducted similarly to that in the embodiment shown in FIGS. 7A and B. That is, the positions at which the recording dots are aggregated are determined in a recording image plane. With the number of the recording dots or the levels of the thresholds increased with respect to the aggregated positions, the conditions to coincide the total sum of the recording dots in the repeated pattern period to the total sum of the recording dots required to express the gradation level are maintained. Simultaneously, a drawing is made in which the number of the recording dots and the shape of the same at each aggregated positon is made uniform. Each matrix area is cut based on the drawing so that the pattern is determined.

FIGS. 9A and 9B illustrate an exmple of the 4×4 dither matrix pattern which are determined by way of the above-described operation. In FIG. 9A, #5 to #8 are matrix patterns which are cyclically selected for use. The patterns #5 to #8 do not respectively include all of the steps 1 to 16, but each four thresholds of 1 to 16 are included in the patterns #5 to #8, respectively. The shape of the aggregattion of the recording dots when the recording dots are formed to the different threshold levels 3, 6, 10, and 13 are shown in (m), (n), (o), and (p) of FIG. 9B . The shape of the aggregation becomes the same at any position on the recording image if the gradation steps are the same. When the threshold level is 10 or 13, the non-recording dot region becomes smaller, the shape of the non-recording dot region being shown in (o') and (p') of FIG. 9B. The reason why the shape of the aggregation of the recording dots is made laterally lengthened is because the shape is made coincide to the fact that the period of the arrangement of the aggregation in the lateral direction is made longer than that in the vertical direction. It is preferable to determine the shape of the aggregation of dots in accordance with the state since the oblique angle of the dot arrangement causes the relationship to be changed.

In the above-described dither matrix pattern, dither matrix patterns smudged by successively specifying the positions of the recording dots, the smudging starting from the matrix pattern having the smallest threshold, can be applied to matrix patterns for each gradation step in the density pattern method. Therefore, the same arrangement of the recording dots as that illustrated in FIGS. 9A and 9B can be obtained.

Although in the above described embodiments, halftone dot pattern is illustrated in which the recording dots are expanded starting from the central portion of the matrix, the present invention can be, as can be clearly seen from the description for the above-described embodiments, applied to a method, such as the Bayer method, in which a plurality of aggregating points for the recording dots are provided in a matrix, or a method of mixture of the dither method and the density pattern method.

As described above with reference to the embodiments, according to the present invention, a method of forming an oblique dot pattern can be provided in which when different color gradation images are superimposed, moire fringes or unstable color reproduction characteristics caused by the offset aggregating positions can be improved by way of obtaining the oblique arrangement of the recording dot aggregation without any complicated calculation necessitating increase in the capacity of the pattern memory. Furthermore, errors caused by the conversion can be reduced, whereby the improvement in the quality of images can be easily and commercially realized.

What is claimed is:

1. A method of forming an oblique dot pattern in an element-density tone production method which uses two types of recording dots comprising a dark value and a light value and a specific matrix structure, whereby pseudo-gradation recording is performed by assigning recording dot positions in a matrix by means of a matrix pattern in accordance with gradation steps of a recording signal, said oblique dot pattern forming method being characterized in that:

a plurality of sets of matrix patterns are provided for the purpose of ensuring that a plurality of different matrix patterns can be selected and assigned to each gradation step;

said plurality of sets of matrix patterns being selected and arranged cyclically in matrix pattern areas which are longitudinally and laterally arranged over a recorded image; and said matrix patterns being so constituted that recorded aggregated dots are arranged in a predetermined oblique angle with respect to said longitudinal and lateral directions of said recorded image.

2. A method of forming an oblique dot pattern according to claim 1, wherein said plurality of sets of matrix patterns are formed by a density pattern method.

3. A method of forming an oblique dot pattern according to claim 1, wherein said plurality of sets of matrix patterns are formed by a dither method.

4. A method of forming an oblique dot pattern according to claim 1, wherein said plurality of sets of matrix patterns are formed by being cut from a plane in which the same gradation step pattern is repeated, in such a manner that cutting positions are offset along an oblique line at 45°.

5. A method of forming an oblique dot pattern according to claim 1, wherein said plurality of sets of matrix patterns are provided for the purpose of making uniform the number of said recorded dots which are recorded in a dot aggregation.

6. A method of forming an oblique dot pattern according to claim 1, wherein said plurality of sets of matrix patterns are provided for the purpose of making uniform the number and shape of said recorded dots in said aggregation of dots.

* * * * *